L. AND H. BENZER.
LENS FOR HEADLIGHTS.
APPLICATION FILED MAR. 5, 1919.
1,314,458. Patented Aug. 26, 1919.
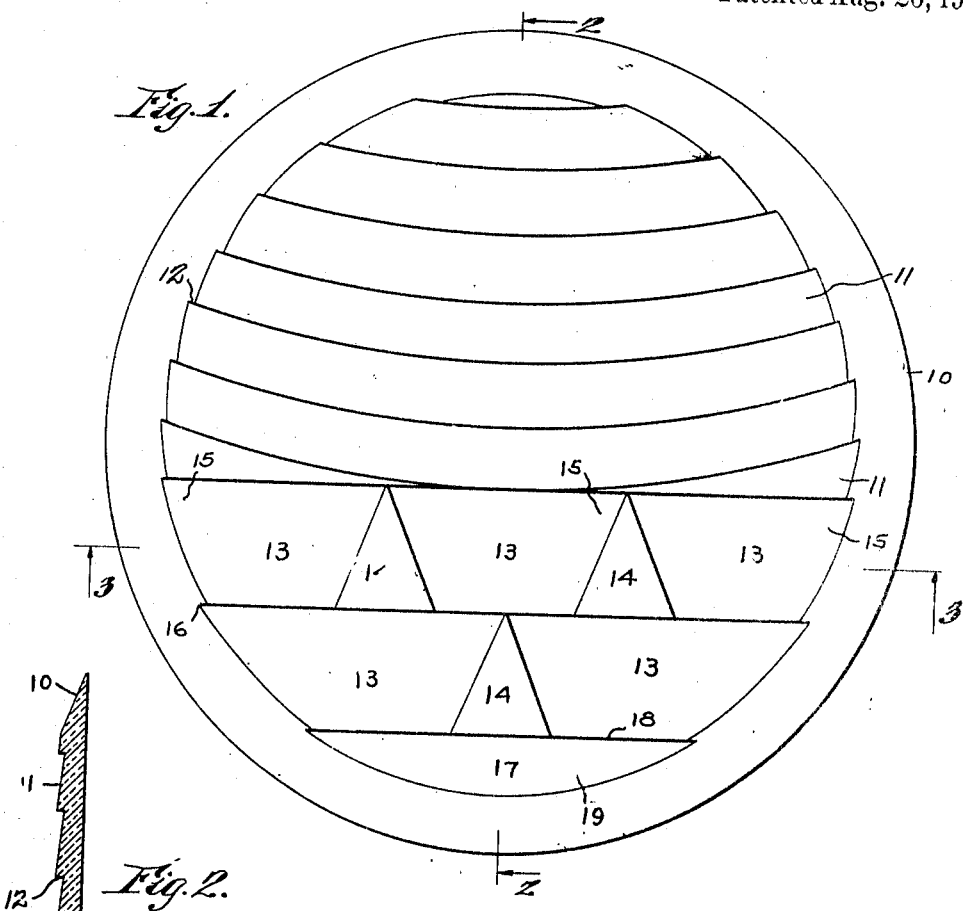
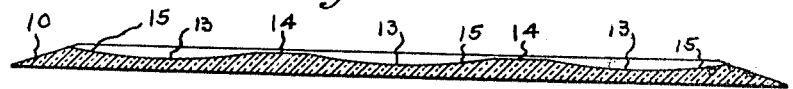
WITNESSES
INVENTORS
LOUIS BENZER,
HENRY BENZER,
BY
ATTORNEYS

UNITED STATES PATENT OFFICE.

LOUIS BENZER AND HENRY BENZER, OF BROOKLYN, NEW YORK, ASSIGNORS TO THE BENZER CORPORATION, OF BROOKLYN, NEW YORK, A CORPORATION OF NEW YORK.

LENS FOR HEADLIGHTS.

1,314,458.  Specification of Letters Patent.  Patented Aug. 26, 1919.

Application filed March 5, 1919. Serial No. 280,728.

*To all whom it may concern:*

Be it known that we, LOUIS BENZER and HENRY BENZER, both citizens of the United States, and residents of the city of New York, borough of Brooklyn, in the county of Kings and State of New York, have invented a new and Improved Lens for Headlights, of which the following is a full, clear, and exact description.

The present invention relates to new and useful improvements in lenses for projectors, and pertains more particularly to lenses adapted for use in headlights of motor vehicles.

In devices of this character, it is very essential that the light rays be projected in such a manner as to provide sufficient light to properly illuminate the road surface, without presenting a direct glare which is blinding to drivers of motor vehicles approaching the lights.

It is the primary object of the present invention to obtain the above result by providing a plurality of angularly disposed facets on the outer surface of a headlight lens.

It is a further object of the invention to so construct the lens of a headligh. that a portion of the rays of the light beam will be directed in opposite directions transversely of the line of travel to provide illumination for the sides of the road.

Reference is to be had to the accompanying drawings forming a part of this specification in which similar characters of reference indicate corresponding parts in all the views, and in which—

Figure 1 is a front elevation of a lens constructed in accordance with the present invention;

Fig. 2 is a vertical sectional view taken on the line 2—2 of Fig. 1;

Fig. 3 is a transverse sectional view taken on the line 3—3 of Fig. 1.

Referring more particularly to the drawings, the device comprises a suitable piece of transparent material, such as glass, which is preferably circular in form and is provided with a continuous bevel edge 10.

The upper section or portion of the lens is divided into a plurality of transversely extending curved panels or the like, 11, and, as shown in Fig. 2, these panels 11 have their exposed faces inclined as shown by the horizontal lines 12, in which lines the top edge of each of the panels 11 terminates. By this construction, it will be seen that the panels 11 form a plurality of refracting facets, by means of which the rays of light are directed downwardly in passing through the lens.

The lower portion of the lens is divided into a plurality of transversely extending panels 13, each of which is wider than the upper curved panels 11. In the panels 13, in spaced relation, are triangularly shaped plane surfaces 14. The space between the ends of the panels 13 and the plane surfaces 14, and the space between the plane surfaces 14, are concave in the direction of the length of the panels, as shown in Fig. 3. By concaving the spaces between the plane surfaces 14, refracting facets 15 are formed, and it is the purpose of these refracting facets 15 to project the light rays passing through the lower portion of the lens, in a direction substantially transverse thereof. As shown by the horizontal walls 16, the lower edge of each of the panels 13 is higher than the upper edge thereof, and in addition to the panels 13 being concave as heretofore described, they are inclined in the same general manner as are the panels 11.

At the extreme bottom of the lens, there is a refracting surface 17, the upper edge of which terminates in a horizontal wall 18. This surface 17 is not concave, as previously mentioned in connection with the facets 15, but has its upper edge considerably below the plane surfaces 14, to provide an angular facet 19 at the bottom of the lens.

From the foregoing description, it will be seen that if this lens is placed in position in a headlight, that portion of the light beam which passes through the curved refracting panels 11, will be projected downwardly thereby. The portion of the light beam which passes through the concave panels 13 will be projected in opposite directions to the side of the light, thus providing suitable means for illuminating the sides of a road when the device is used for motor vehicle headlights. That portion of the light beam which passes through the surface 17 will be directed downwardly in the same manner as the portion of light passing through the panels 11.

In actual practice, it has been found that if the concave facets 15 were terminated in a straight line instead of triangular plane surfaces, such as 14, glaring beams of light would be projected therethrough. However, the forming of these plane surfaces 14 as above described, entirely eliminates the projection of glaring beams of light at the ends of the concave facets 15.

From the foregoing, it will be apparent that the present invention provides a lens for headlights of all types, in which the glare is entirely eliminated without detracting in any degree from the efficiency of the lens from a standpoint of illumination.

Having thus described our invention, we claim as new and desire to secure by Letters Patent:

1. A lens for headlights having its upper portion divided into a plurality of transversely extending arcuate prismatic surfaces, the ends of which lie in a plane above the intermediate portions thereof, a plurality of transversely concave parallel prismatic surfaces in the lower portion of said lens, and triangular plane surfaces interposed between said transversely concave prismatic surfaces.

2. A lens for headlights having its upper portion divided into a plurality of transversely extending arcuate prismatic surfaces, a plurality of transversely concave and angularly disposed prismatic surfaces in the lower portion of said lens, and triangularly shaped plane surfaces separating the transversely concave angular surfaces in the lower portion of said lens, said triangularly shaped plane surfaces being staggered with respect each to the other.

LOUIS BENZER.
HENRY BENZER.